US011881619B2

(12) United States Patent
Hiraoka et al.

(10) Patent No.: US 11,881,619 B2
(45) Date of Patent: Jan. 23, 2024

(54) ANTENNA APPARATUS

(71) Applicant: Sony Group Corporation, Tokyo (JP)

(72) Inventors: Yoshiaki Hiraoka, Tokyo (JP); Yuichiro Suzuki, Tokyo (JP); Takayoshi Ito, Tokyo (JP); Tomihiro Omuro, Tokyo (JP); Toru Ozone, Tokyo (JP); Jin Sato, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 342 days.

(21) Appl. No.: 17/299,805

(22) PCT Filed: Dec. 13, 2018

(86) PCT No.: PCT/JP2018/045880
§ 371 (c)(1),
(2) Date: Jun. 4, 2021

(87) PCT Pub. No.: WO2020/121482
PCT Pub. Date: Jun. 18, 2020

(65) Prior Publication Data

US 2022/0029284 A1 Jan. 27, 2022

(51) Int. Cl.
*H01Q 1/50* (2006.01)
*H01Q 1/24* (2006.01)
*H01Q 1/52* (2006.01)
*H01Q 5/307* (2015.01)

(52) U.S. Cl.
CPC ............... *H01Q 1/52* (2013.01); *H01Q 1/243* (2013.01); *H01Q 1/521* (2013.01); *H01Q 5/307* (2015.01)

(58) Field of Classification Search
CPC .. H01Q 1/242-245; H01Q 1/52; H01Q 5/307; H01Q 1/521; H01Q 5/40; H01Q 9/0414; H01Q 21/24; H01Q 21/28
See application file for complete search history.

(56) References Cited

U.S. PATENT DOCUMENTS 8,432,320 B2 * 4/2013 Jagielski .................. H01Q 9/46 343/702
10,505,262 B2 * 12/2019 Liu ........................ H01Q 21/28
10,522,900 B2 * 12/2019 Khripkov ............... H01Q 1/243
10,868,356 B1 * 12/2020 Da Costa Bras Lima .................. H01Q 1/273
2014/0062801 A1 3/2014 Yong
(Continued)

FOREIGN PATENT DOCUMENTS

CN 102097675 A 6/2011
CN 204807095 U * 11/2015
(Continued)

OTHER PUBLICATIONS

A travel information inquiring device based on internet of things—CN-204807095-U—Han Yan. (Year: 2015).*
(Continued)

*Primary Examiner* — Vibol Tan
(74) *Attorney, Agent, or Firm* — XSENSUS LLP

(57) ABSTRACT

[Problem] To prevent radiation waves from being reflected inside a casing when a plurality of antennas compatible with different frequencies are mounted. [Solution] According to the present disclosure, provided is an antenna apparatus including a first antenna that operates at a first frequency, and a second antenna that is arranged on an outer side of a casing relative to the first antenna, that operates at a second frequency lower than the first frequency, and that includes an opening in a radiation direction of the first antenna.

18 Claims, 10 Drawing Sheets

(56) References Cited

U.S. PATENT DOCUMENTS

| | | | | |
|---|---|---|---|---|
| 2014/0354487 | A1 | 12/2014 | Liang | |
| 2016/0056530 | A1 | 2/2016 | Lee | |
| 2017/0201014 | A1 | 7/2017 | Lee | |
| 2017/0294705 | A1 | 10/2017 | Khripkov et al. | |
| 2018/0026341 | A1* | 1/2018 | Mow | H01Q 1/243 343/702 |
| 2018/0034134 | A1 | 2/2018 | Dalmia | |

FOREIGN PATENT DOCUMENTS

| | | | |
|---|---|---|---|
| CN | 206962004 | U | 2/2018 |
| CN | 207518637 | U | 6/2018 |
| CN | 108432041 | A | 8/2018 |
| CN | 108886202 | A | 11/2018 |
| CN | 210074170 | U | 2/2020 |
| JP | 2-252304 | A | 10/1990 |
| JP | 2001-102849 | A | 4/2001 |
| JP | 2010-130534 | A | 6/2010 |
| JP | 2012-134950 | A | 7/2012 |
| JP | 3212835 | U | 10/2017 |
| WO | 2011/024722 | A1 | 3/2011 |
| WO | 2018/186065 | A1 | 10/2018 |

OTHER PUBLICATIONS

International Search Report and Written Opinion dated Jan. 22, 2019, received for PCT Application PCT/JP2018/045880, Filed on Dec. 13, 2018, 8 pages including English Translation.

* cited by examiner

ANTENNA APPARATUS

CROSS-REFERENCE TO RELATED APPLICATION

The present application is based on PCT filing PCT/JP2018/045880, filed Dec. 13, 2018, the entire contents of which are incorporated herein by reference.

FIELD

The present disclosure relates to an antenna apparatus.

BACKGROUND

Conventionally, for example, Patent Literature 1 listed below describes a technology that makes it possible to, in a mobile terminal using an antenna apparatus having directivity in a certain direction, change the directivity to an intended direction independent of a posture of the mobile terminal.

CITATION LIST

Patent Literature

Patent Literature 1: JP 2012-134950 A

SUMMARY

Technical Problem

In recent years, it is expected to transmit large volumes of data at a high speed by newly using 5G frequency bands in addition to frequency bands of mobile terminals used for existing 4G.

Here, if an antenna apparatus for 5G is to be mounted on a mobile terminal compatible with 4G, there is a problem in that radiation waves of the antenna apparatus for 5G are reflected by an antenna apparatus for 4G inside a casing. In particular, if a metal member constituting an antenna for 4G is arranged so as to surround an outer periphery of the mobile terminal, the antenna apparatus for 5G is arranged inside the metal member, so that radiation waves from the antenna for apparatus 5G are reflected by the antenna apparatus for 4G inside a casing. In contrast, if the antenna for 5G is arranged outside of the antenna for 4G, a size of the terminal increases and characteristics of the antenna for 4G is degraded, which are problems.

Therefore, when a plurality of antennas compatible with different frequencies are mounted, it is demanded to prevent radiation waves from being reflected inside a casing.

Solution to Problem

According to the present disclosure, an antenna apparatus is provided that includes: a first antenna that operates at a first frequency; and a second antenna that is arranged on an outer side of a casing relative to the first antenna, that operates at a second frequency lower than the first frequency, and that includes an opening in a radiation direction of the first antenna.

Advantageous Effects of Invention

As described above, according to the present disclosure, when a plurality of antennas compatible with different frequencies are mounted, it is possible to prevent radiation waves from being reflected inside a casing.

Further, the effects described above are not limitative. That is, with or in the place of the above effects, any of the effects described in this specification or other effects that can be recognized from this specification may be achieved.

DESCRIPTION OF EMBODIMENTS

Figure 1:
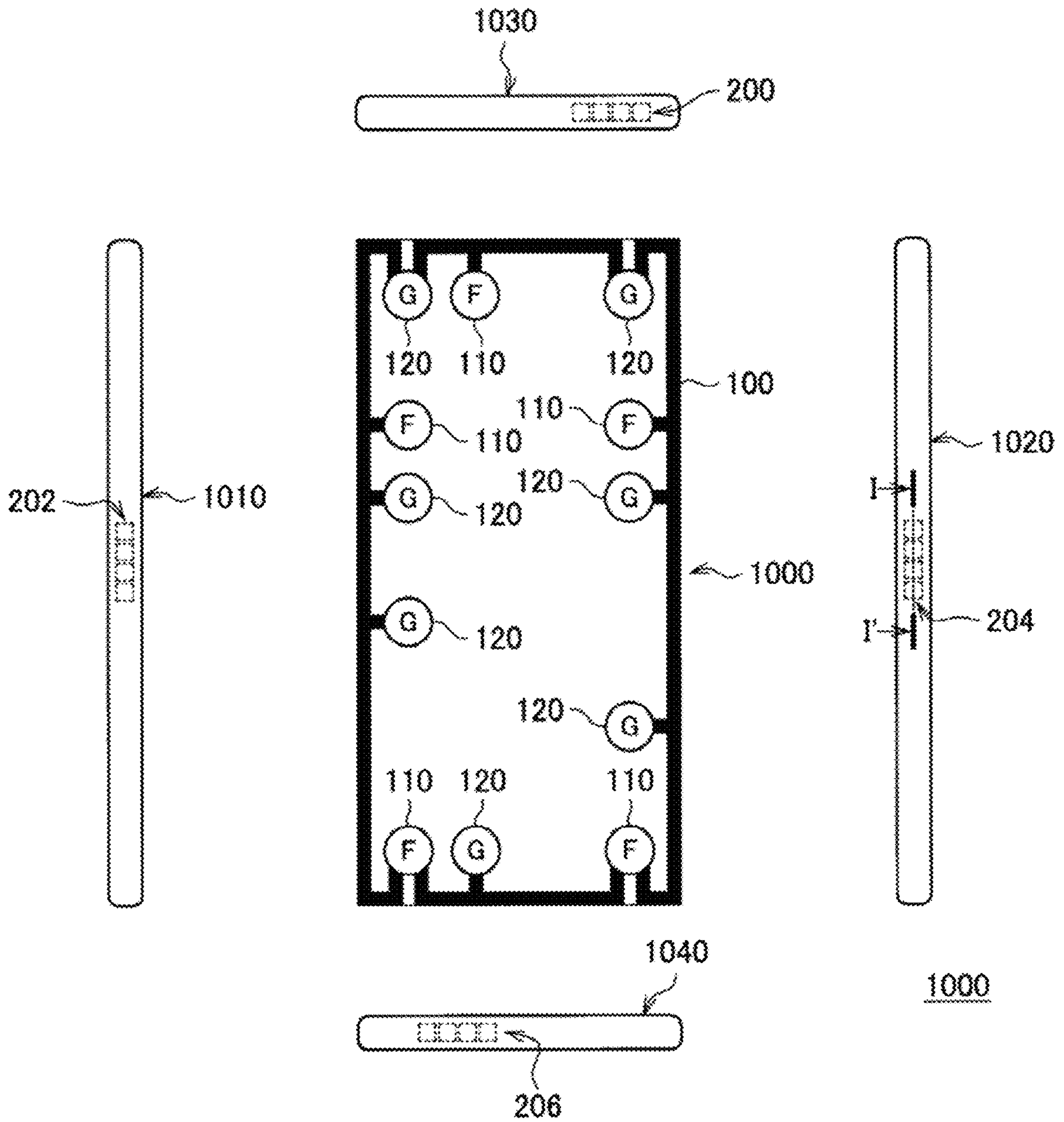
FIG. 1 is a schematic diagram illustrating a state in which a mobile terminal is viewed from a back side.

Preferred embodiments of the present disclosure will be described in detail below with reference to the accompanying drawings. Meanwhile, in the present specification and drawings, structural elements having substantially the same functions and configurations are denoted by the same reference symbols, and repeated explanation will be omitted.

Further, explanation will be given in sequence below.

1. Overview of antenna apparatus
2. Configuration of antenna apparatus
3. Configuration on antenna apparatus including passive elements
4. Configuration of patch antennas
5. Distances between patch antennas and passive elements
6. Use of antenna apparatus 1. Configurations of Antenna Apparatus and Peripheral Apparatuses First, with reference to FIG. 1, schematic configuration of an antenna apparatus 100 and peripheral apparatuses according to one embodiment of the present disclosure will be described. The present embodiment is related to an antenna apparatus that is adopted when a 5G millimeter-wave communication function is mounted on a mobile terminal 1000 that includes an antenna compatible with 4G (LTE). In 4G (LTE), frequencies of 700 MHz to 3.5 GHz are used, but in 5G, higher frequencies, which are called millimeter waves, than those of 4G are used. The frequencies compatible with the 5G millimeter waves are, as one example, 24.25 to 29.5 GHz and 37 to 40 GHz. Details of bands defined by 3GPP as described in TS38 104 V15.3 or the like are as follows: 26.5 to 29.5 GHz for n257, 24.25 to 27.5 GHz for n258, 37 to 40 GHz for n260, and 27.5 to 28.35 GHz for n261. Further, in the 5G millimeter waves, a horizontally/vertically dual-polarized antenna called polarized MIMO is mounted to enable high-capacity communication.

FIG. 1 is a schematic diagram illustrating a mobile terminal and includes, in the center thereof, a plan view 1000 that illustrates a state in which the mobile terminal is viewed from a back side. In the central figure in FIG. 1, when the mobile terminal 1000 is viewed from the back side, an external metal 100, power feed units 110 for the external metal 100, and grounds (GNDs) 120 of an antenna of the external metal 100 are illustrated in a transparent manner. The external metal 100 is arranged so as to surround a periphery of the mobile terminal 1000. The peripheral metal 100 functions as an antenna (ring antenna) in a 4G terminal.

Further, in FIG. 1, a right side surface 1010, a left side surface 1020, an upper surface 1030, and a lower surface 1040 of the mobile terminal 1000 are illustrated.

As illustrated in FIG. 1, in the mobile terminal 1000, antennas 200, 202, 204, and 206 for 5G millimeter-wave communication are mounted. The antennas 200, 202, 204, and 206 are arranged on the side surfaces, the upper surface, and the lower surface of the mobile terminal 1000 so as to be oriented outward. Each of the antennas 200, 202, 204, and 206 is configured with patch antennas.

Figure 2:
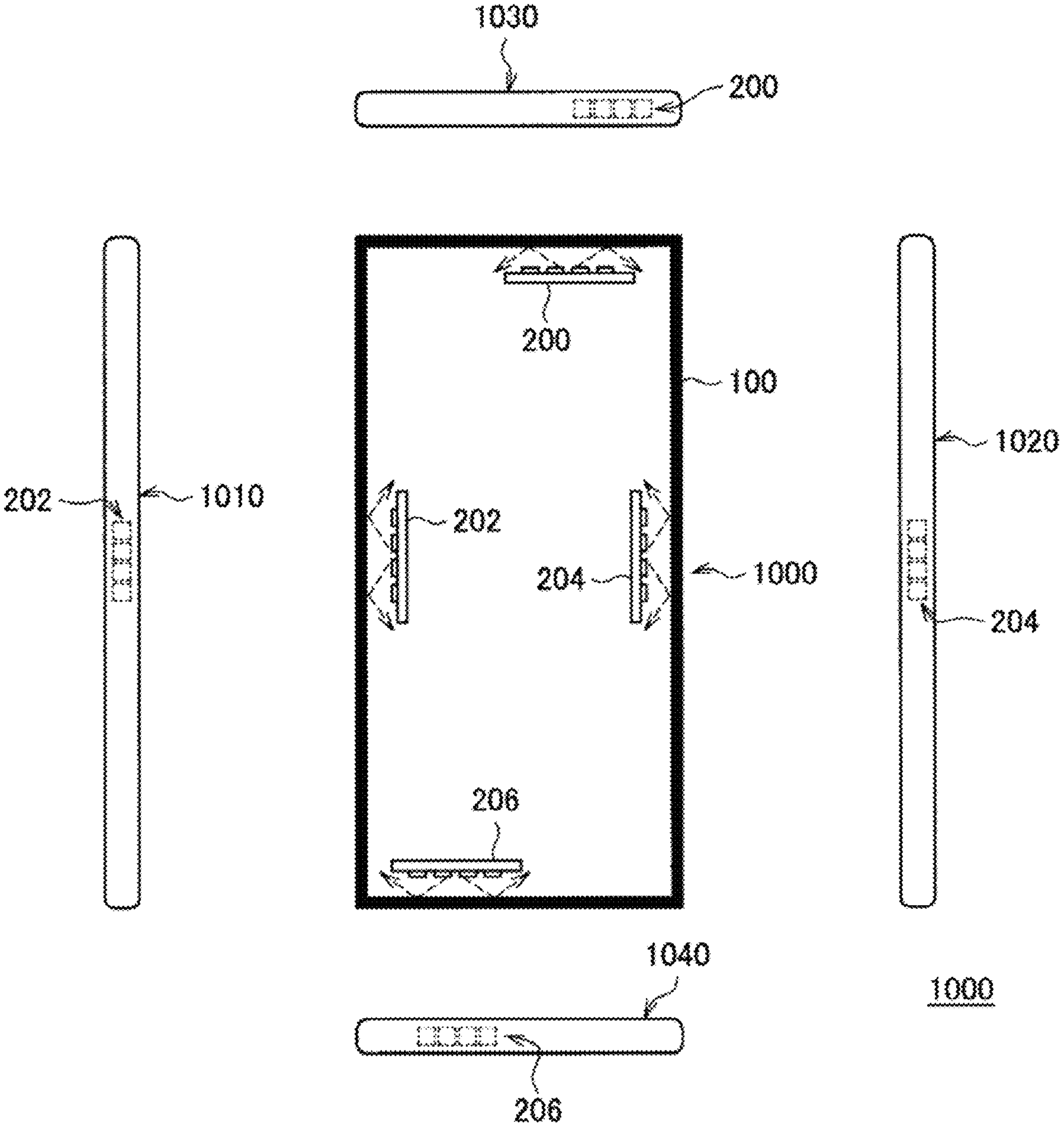
FIG. 2 is a schematic diagram illustrating a state in which radiation waves are reflected by an external metal.

In FIG. 1, if the external metal 100 is arranged on the outer sides of the antennas 200, 202, 204, and 206, radiation waves are reflected by the external metal 100 in this state, so that it is difficult to enable the antennas. FIG. 2 is a schematic diagram illustrating a state in which radiation waves from the antennas 200, 202, 204, and 206 are reflected by the external metal 100. The millimeter waves have high straightness, so that reflected waves are attenuated. Therefore, if the mobile terminal 1000 uses a signal in this frequency, an antenna configuration capable of transmitting and receiving direct waves in all-around directions (six surfaces, 360 degrees) of end surfaces of the casing is adopted. Furthermore, to realize the polarized MIMO, horizontally/vertically dual-polarized antennas with respect to the all-around directions are adopted. Therefore, while FIG. 1 illustrates the four antennas on the side surfaces, the upper surface, and the lower surface of the mobile terminal 1000, antennas are also arranged on a top surface and a back surface. However, on the top surface and the back surface, the external metal 100 does not block the radiation waves, and therefore, it is not necessary to take into account, on the top surface and the back surface, reflection of radiation waves by the external metal 100.

2. Configuration of Antenna Apparatus

Figure 3A:
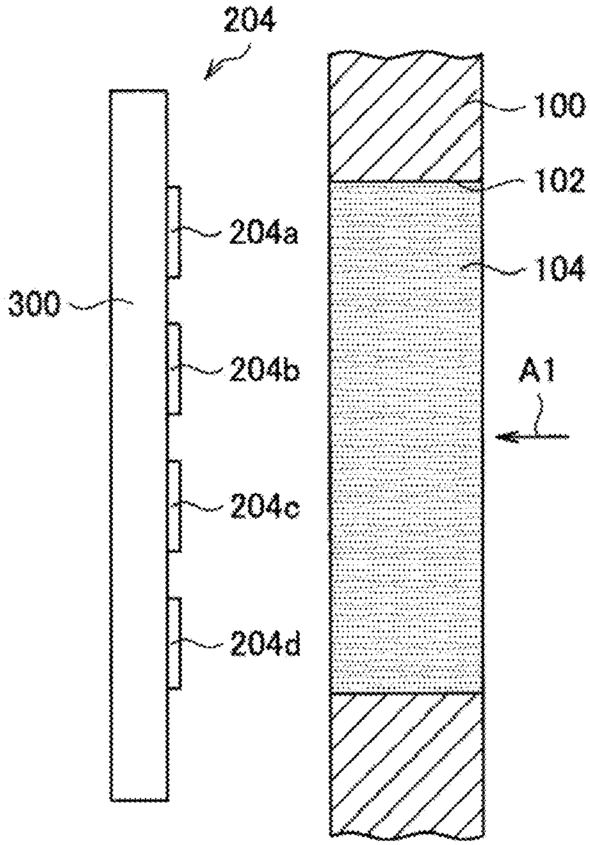
FIG. 3A is a schematic diagram illustrating a cross section cut along a chain line I-I' illustrated on a left side surface in FIG. 1.
Figure 3B:
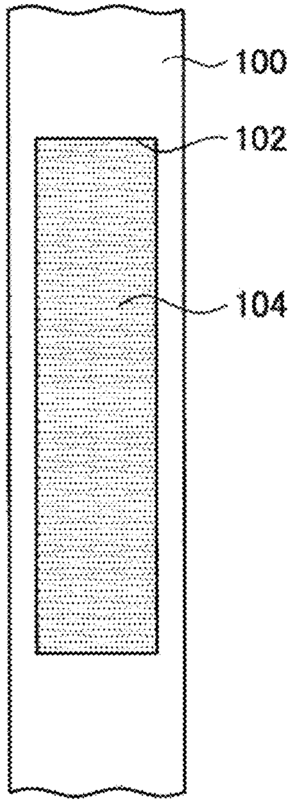
FIG. 3B is a schematic diagram illustrating a state in which an opening is viewed from a direction of arrow μl in FIG. 3A.

To cope with the above, in the present embodiment, openings 102 are arranged in the external metal 100 at positions of the antennas 200, 202, 204, and 206. FIG. 3A is a schematic diagram illustrating a cross section cut along a chain line I-I' illustrated in the left side surface 1020 in FIG. 1. The antennas 200, 202, 204, and 206 are arranged on the inner side of the external metal 100 inside a casing of the mobile terminal 1000. As illustrated in FIG. 3A, the antenna 204 includes four patch antennas 204*a*, 204*b*, 204*c*, and 204*d* that are arranged on a millimeter-wave antenna module 300. Further, FIG. 3B is a schematic diagram illustrating a state in which the opening 102 is viewed in a direction of arrow μl in FIG. 3A, that is, viewed from outside of the mobile terminal 1000. As illustrated in FIG. 3A and FIG. 3B, the opening 102 is filled with the resin material 104.

As illustrated in FIG. 3A, the opening 102 is arranged in radiation directions of the patch antennas 204*a*, 204*b*, 204*c*, and 204*d*, so that the millimeter waves are not reflected by the external metal 100 and the millimeter waves can be radiated to the outside of the mobile terminal 1000. With this configuration, the antenna for 4G can use the external metal 100, and the antenna for 5G can be configured with the patch antennas 204*a*, 204*b*, 204*c*, and 204*d*, so that the antenna for 4G and the antenna for 5G can coexist with each other. Furthermore, a ring antenna including an external electrode 100 can be used as the antenna for 4G, so that even if a millimeter-wave antenna for 5G is mounted, it is possible to prevent an increase in a size of the terminal and prevent degradation of the characteristics of the antenna. Meanwhile, it is possible to implement the function of the antenna 204 even without filling the opening 102 with the resin material 104, but it is preferable to fill the opening 102 with the resin material 104 to prevent adhesion of dust or the like.

Figure 4:
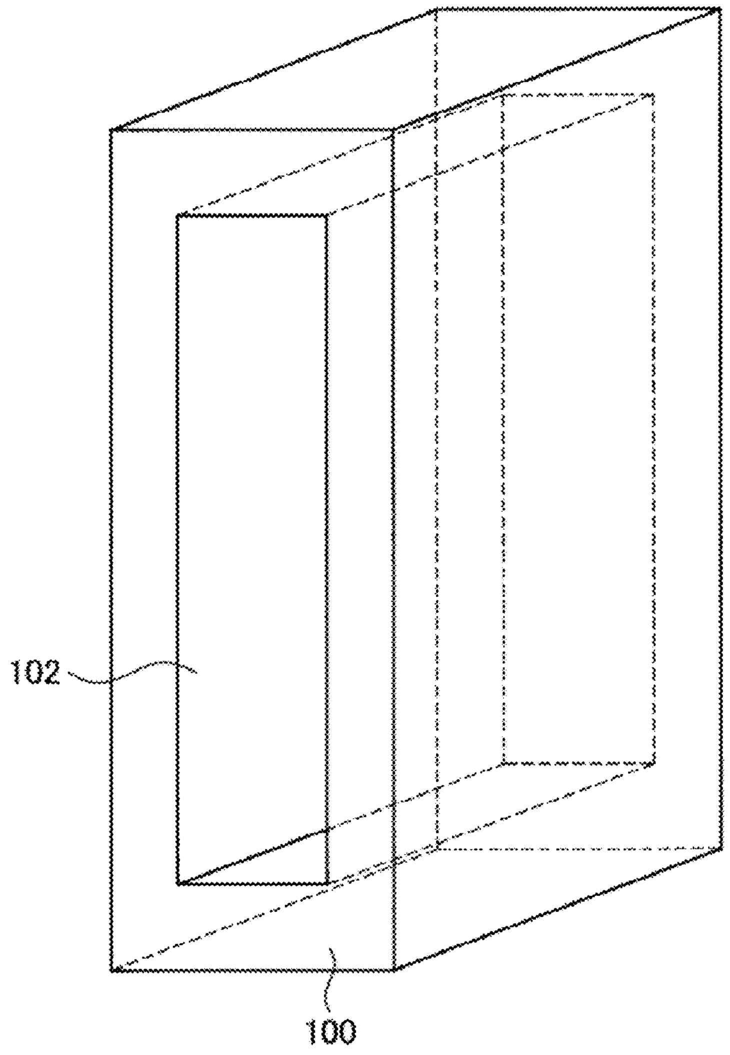
FIG. 4 is a perspective view illustrating a configuration of an opening in the exterior metal.

FIG. 4 is a perspective view illustrating a configuration of the opening 102 in the exterior metal 100. In the example illustrated in FIG. 3A and FIG. 3B, the opening 102 having a rectangular opening portion as illustrated in FIG. 4 is arranged. The opening 102 is filled with the resin material 104.

3. Configuration of Antenna Apparatus Including Passive Elements

Figure 5A:
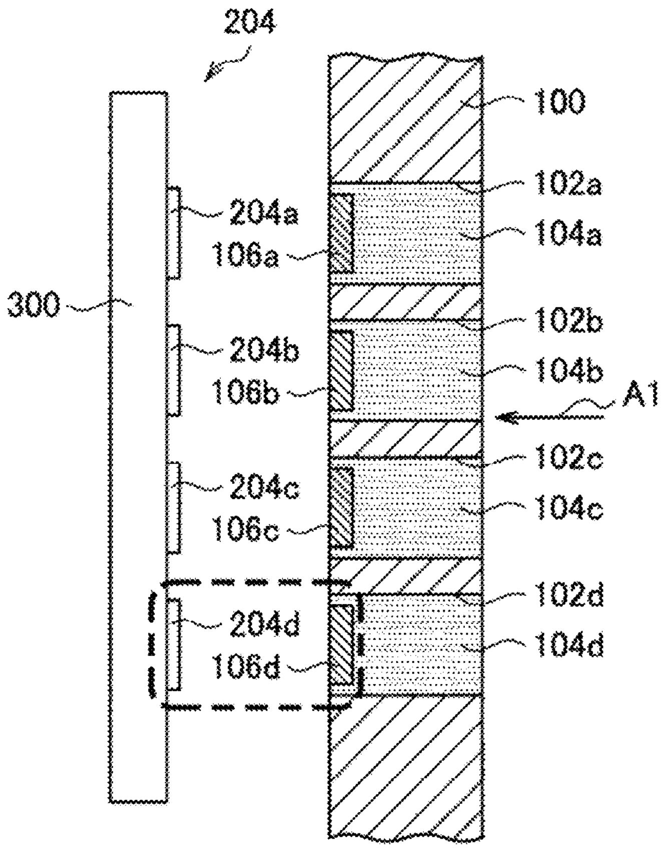
FIG. 5A is a schematic diagram illustrating another example of an antenna.
Figure 5B:
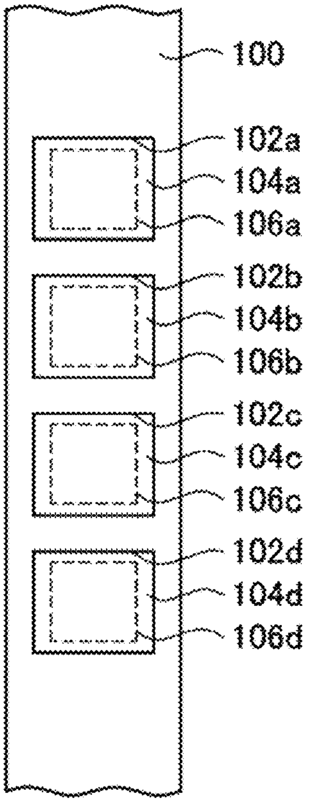
FIG. 5B is a schematic diagram illustrating still another example of the antenna.

FIG. 5A and FIG. 5B are schematic diagrams illustrating another configuration of the antenna 204. FIG. 5A is a schematic diagram illustrating a cross section cut along a chain line I-I' illustrated in the left side surface 1020 in FIG. 1. Further, FIG. 5B is a schematic diagram illustrating a state in which the antenna 204 is viewed from a direction of arrow μl in FIG. 5A.

In the example illustrated in FIG. 5A and FIG. 5B, four openings 102*a*, 102*b*, 102*c*, and 102*d* are arranged at positions corresponding to the patch antennas 204*a*, 204*b*, 204*c*, and 204*d*. The four openings 102*a*, 102*b*, 102*c*, and 102*d* are respectively filled with resin materials 104*a*, 104*b*, 104*c*, and 104*d*. Further, passive elements 106*a*, 106*b*, 106*c*, and 106*d* are arranged at positions facing the respective patch antennas 204*a*, 204*b*, 204*c*, and 204*d*. The passive elements 106*a*, 106*b*, 106*c*, and 106*d* are made of metal and insulated from the external metal 100 by the resin materials 104*a*, 104*b*, 104*c*, and 104*d*.

With this configuration, the patch antennas 204*a*, 204*b*, 204*c*, and 204*d* are respectively spatially integrated with the passive elements 106*a*, 106*b*, 106*c*, and 106*d*, so that millimeter waves radiated from the patch antennas 204*a*, 204*b*, 204*c*, and 204*d* are radiated from the passive elements 106*a*, 106*b*, 106*c*, and 106*d* to the outside of the mobile terminal 1000.

Figure 6:
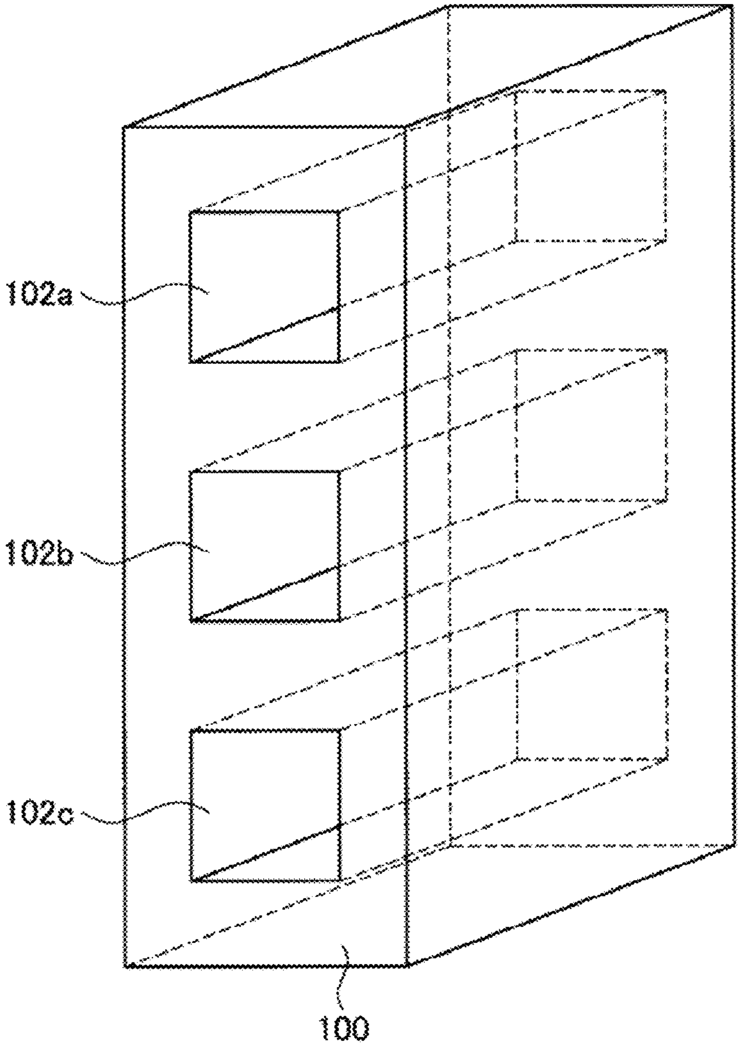
FIG. 6 is a perspective view illustrating configurations of openings in the exterior metal.

FIG. 6 is a perspective view illustrating configurations of openings 102*a*, 102*b*, 102*c*, and 102*d* in the exterior metal 100. In the examples illustrated in FIG. 5A and FIG. 5B, the openings 102*a*, 102*b*, 102*c*, and 102*d* having square opening portions as illustrated in FIG. 6 are arranged. The passive elements 106*a*, 106*b*, 106*c*, and 106*d* are arranged inside the openings 102*a*, 102*b*, 102*c*, and 102*d*, and the openings 102*a*, 102*b*, 102*c*, and 102*d* are filled with the resin materials 104*a*, 104*b*, 104*c*, and 104*d*.

4. Configurations of Patch Antennas

Figure 7A:
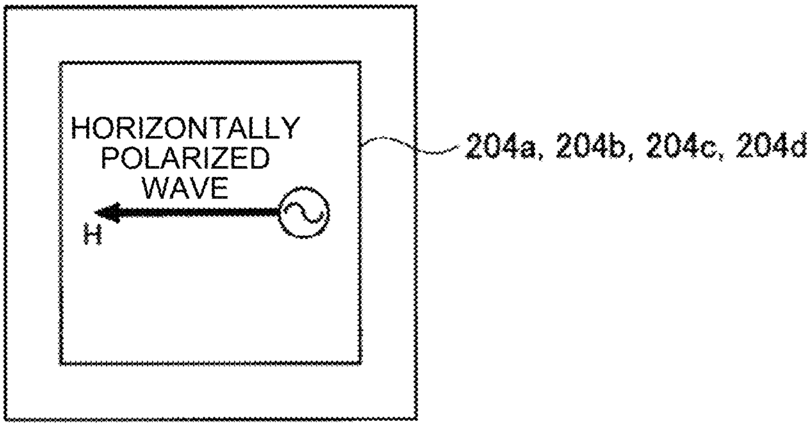
FIG. 7A is a schematic diagram for explaining configurations of patch antennas.
Figure 7B:
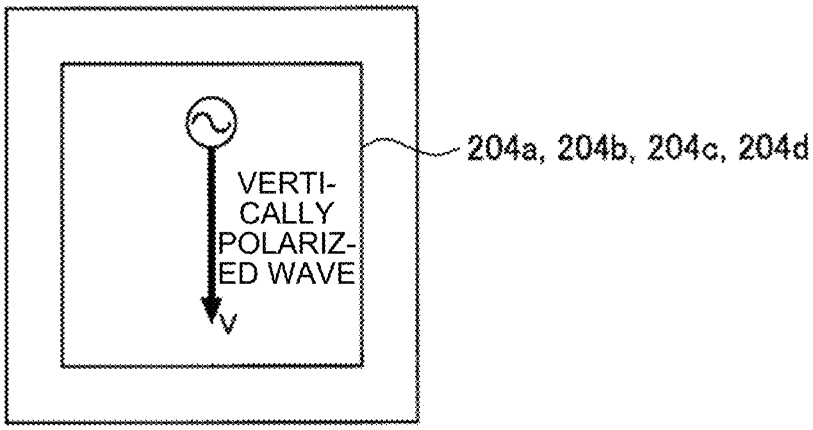
FIG. 7B is a schematic diagram for explaining the configurations of the patch antennas.
Figure 7C:
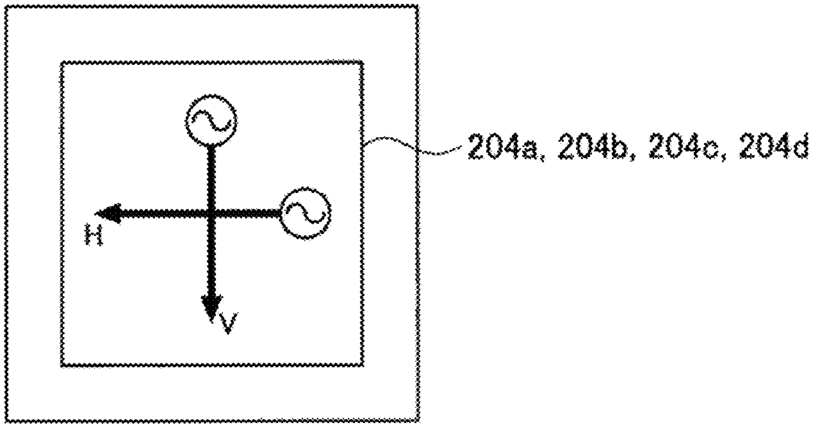
FIG. 7C is a schematic diagram for explaining the configurations of the patch antennas.

FIG. 7A to FIG. 7C are schematic diagrams for explaining configurations of the patch antennas 204*a*, 204*b*, 204*c*, and 204*d*. FIG. 7A is a schematic diagram illustrating a state in which horizontally polarized waves are fed to the patch antennas 204*a*, 204*b*, 204*c*, and 204*d*. Further, FIG. 7B is a schematic diagram illustrating a state in which vertically polarized waves are fed to the patch antennas 204*a*, 204*b*, 204*c*, and 204*d*. Furthermore, FIG. 7C is a schematic diagram illustrating a state in which horizontally polarized waves and vertically polarized waves are fed to the patch antennas 204*a*, 204*b*, 204*c*, and 204*d*.

Figure 8:
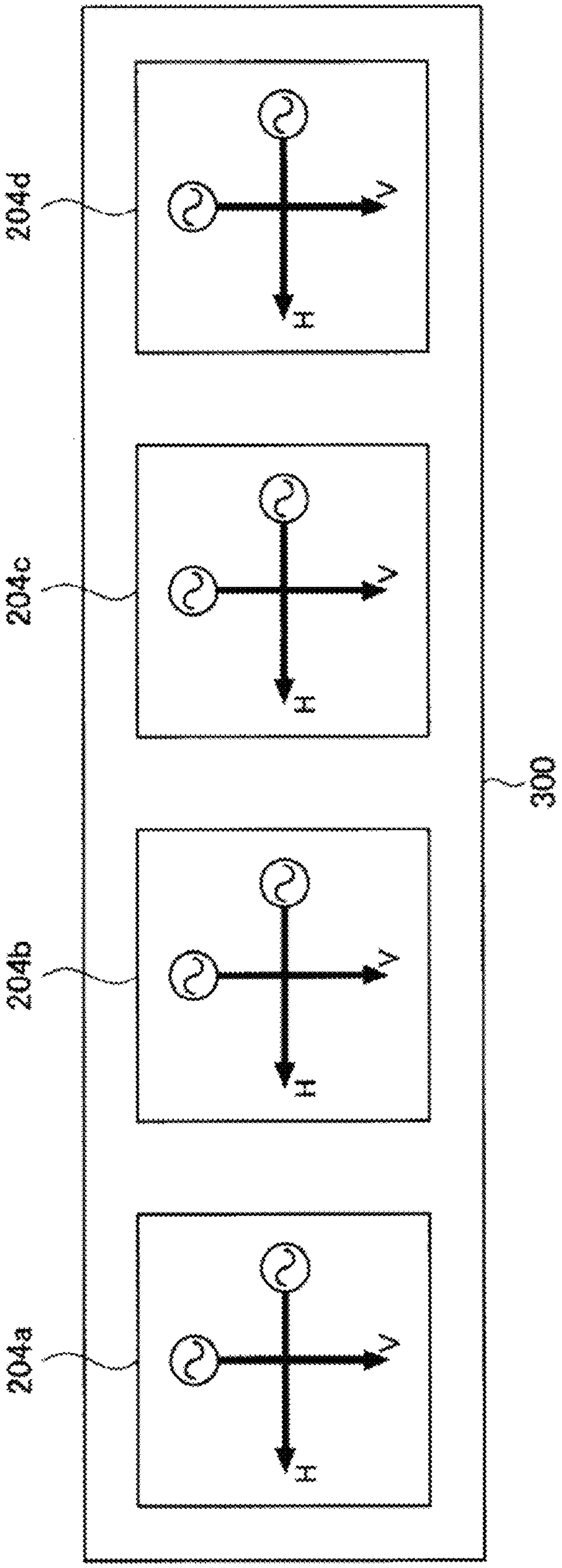
FIG. 8 is a plan view illustrating a configuration of the antenna.

As illustrated in FIG. 7C, the patch antennas 204*a*, 204*b*, 204*c*, and 204*d* have horizontally/vertically dual-polarized structure in which second feeds are arranged at positions rotated by 90 degrees from first feed positions. With this configuration, it is possible to configure antennas that transmit and receive horizontally/vertically dual-polarized signals. By arranging the patch antennas 204*a*, 204*b*, 204*c*, and 204*d* with dual power feeds as described above on the millimeter-wave antenna module 300, the antenna 204 as illustrated in FIG. 8 is constructed.

5. Intervals Between Patch Antennas and Passive Elements

Intervals between the patch antennas 204*a*, 204*b*, 204*c*, and 204*d* and the passive elements 106*a*, 106*b*, 106*c*, and 106*d* in the configuration examples illustrated in FIG. 5A and FIG. 5B will be described below. A size d1 of each of the patch antennas 204*a*, 204*b*, 204*c*, and 204*d* illustrated in FIG. 9 can be obtained from Expression (1) below. In Expression (1), $\varepsilon_r$ is relative permittivity of a resin frame.

$$d1=\lambda/2\sqrt{(\varepsilon_r)} \quad (1)$$

Figure 9:
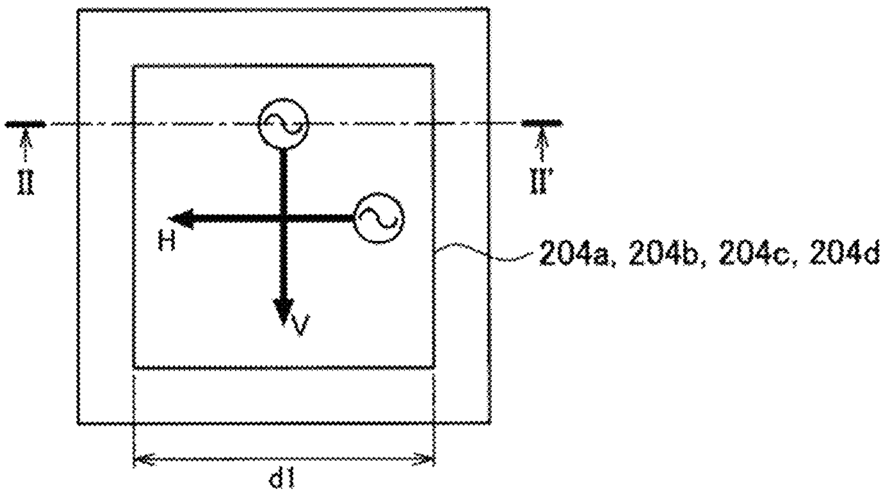
FIG. 9 is a schematic diagram illustrating sizes of the patch antennas.
Figure 10:
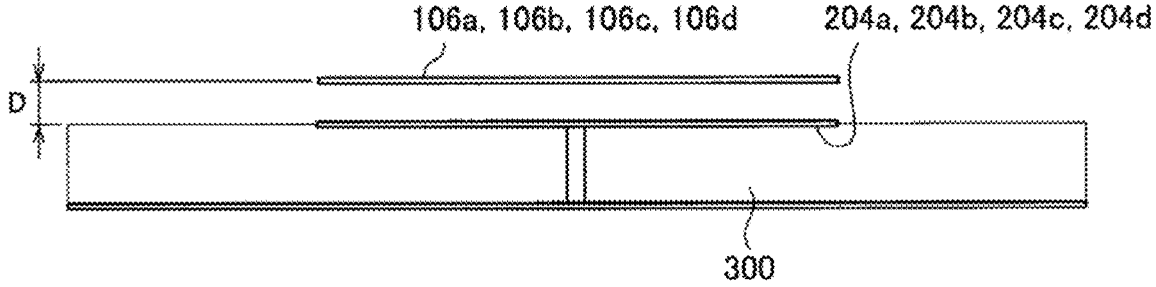
FIG. 10 is a schematic diagram illustrating a cross section at a position along a chain line II-II' illustrated in FIG. 9.

FIG. 10 is a schematic diagram illustrating a cross section at a position along a chain line II-II' illustrated in FIG. 9, and illustrates a distance D between the patch antennas 204*a*, 204*b*, 204*c*, and 204*d* and the passive elements 106*a*, 106*b*, 106*c*, and 106*d* that are arranged above the patch antennas 204*a*, 204*b*, 204*c*, and 204*d*.

Figure 11:
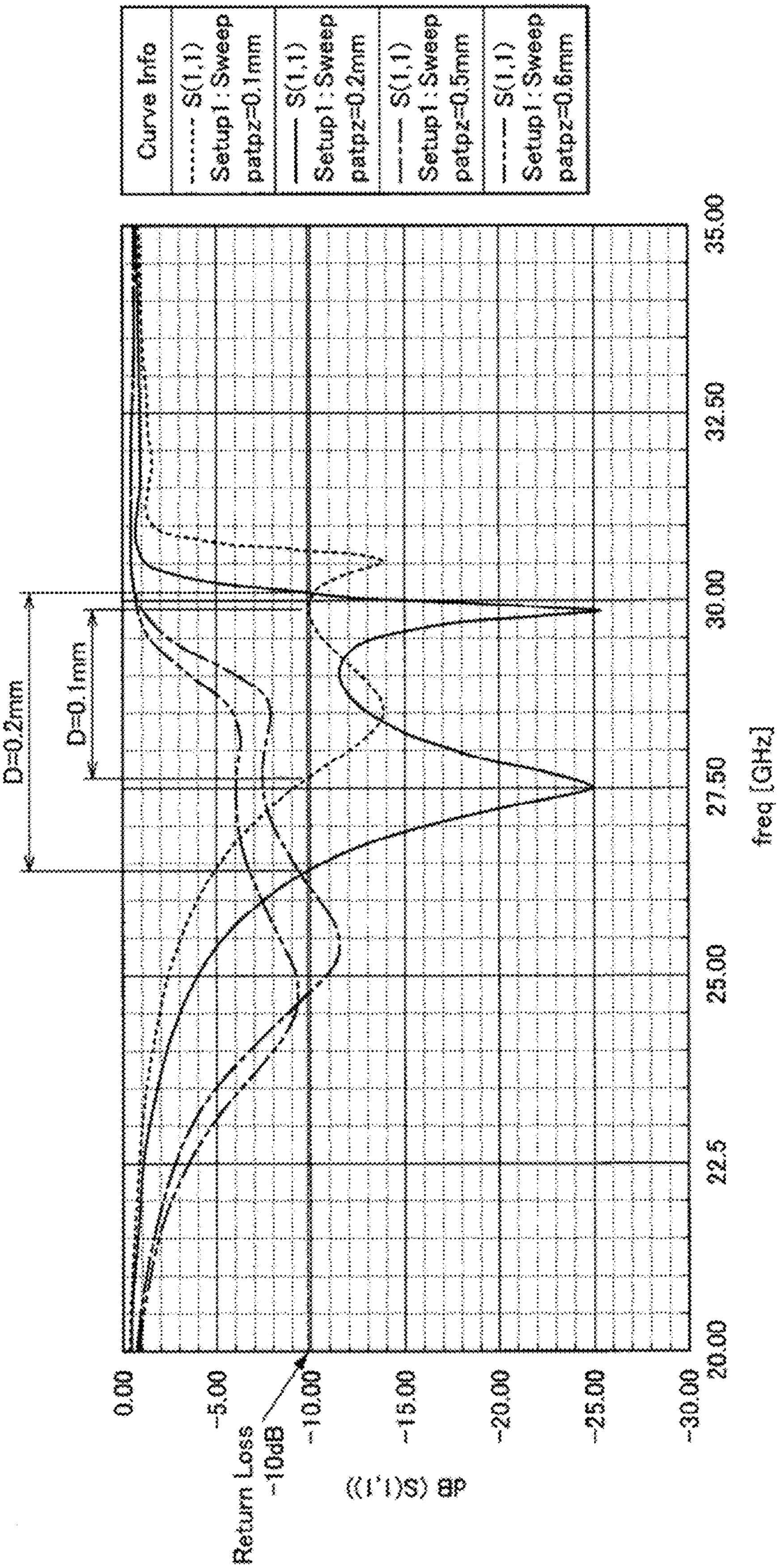
FIG. 11 is a property diagram illustrating simulation results obtained when a distance D between the patch antennas and passive elements is used as a parameter.

FIG. 11 is a property diagram illustrating simulation results obtained when the distance D between the patch antennas 204*a*, 204*b*, 204*c*, and 204*d* and the passive elements 106*a*, 106*b*, 106*c*, and 106*d* is used as a parameter under a condition that a millimeter-wave frequency is set to 26.5 GHz to 29.5 GHz, substrate permittivity is set to 3.4, and d1 is set to 2.55 mm. In FIG. 11, a horizontal axis represents a frequency, and a vertical axis represents a return loss. If the return loss on the vertical axis reaches −10 dB or lower in FIG. 11, the condition is preferable to cause the antenna to function.

In FIG. 11, a dashed line represents a simulation result that is obtained when D=0.1, a solid line represents a simulation result that is obtained when D=0.2, a chain line represents a simulation result that is obtained when D=0.5, and a chain double-dashed line represents a simulation result that is obtained when D=0.6. As illustrated in FIG. 11, if D=0.6, the return loss exceeds −10 dB, so that the condition is not preferable to cause the antenna to function.

In contrast, in cases where D=0.1, D=0.2, and D=0.5, the return loss is equal to or lower than −10 dB, which is preferable to cause the antenna to function. Therefore, it is preferable to set the distance between the patch antennas 204*a*, 204*b*, 204*c*, and 204*d* and the passive elements 106*a*, 106*b*, 106*c*, and 106*d* to 0.5 mm or smaller.

Furthermore, it is possible to increase a bandwidth of the antenna in accordance with the distance D, and if D=0.2 mm, it is possible to most widely extend a frequency band F in which the return loss is equal to or lower than −10 dB.

6. Use of Antenna Apparatus

The antenna apparatus according to the present disclosure is applicable to various fields, such as IoT or apparatuses mounted on vehicles, in addition to the mobile terminal as described above.

While the preferred embodiments of the present disclosure have been described in detail above with reference to the accompanying drawings, the technical scope of the present disclosure is not limited to the examples as described above. It is obvious that a person skilled in the technical field of the present disclosure may conceive various alternations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Note that the following configurations also belong to the technical scope of the present disclosure.

(1)

An antenna apparatus comprising:
- a first antenna that operates at a first frequency; and
- a second antenna that is arranged on an outer side of a casing relative to the first antenna, that operates at a second frequency lower than the first frequency, and that includes an opening in a radiation direction of the first antenna.

(2)

The antenna apparatus according to (1), wherein the second antenna is arranged so as to surround an outer periphery of the casing.

(3)

The antenna apparatus according to (1) or (2), wherein the opening is filled with a resin material.

(4)

The antenna apparatus according to any one of (1) to (3), wherein a passive element is arranged, in the opening, at a position facing the second antenna.

(5)

The antenna apparatus according to (4), wherein
- the second antenna includes a plurality of patch antennas that are arrayed,
- the plurality of passive elements are arranged so as to correspond to a plurality of patch antennas, and
- the plurality of passive elements respectively face the plurality of patch antennas.

(6)

The antenna apparatus according to (5), wherein a distance between the plurality of patch antennas and the plurality of passive elements is equal to or smaller than 0.5 millimeters (mm).

(7)

The antenna apparatus according to any one of (1) to (6), wherein
- the first frequency is a millimeter-wave frequency compatible with 5G, and
- the second frequency is a frequency equal to or lower than 4 GHz.

(8)

The antenna apparatus according to any one of (1) to (7), wherein the antenna apparatus is mounted on a mobile terminal.

(9)

The antenna apparatus according to any one of (1) to (7), wherein the antenna apparatus is mounted on one of an IoT terminal and an on-vehicle terminal.

REFERENCE SIGNS LIST

100 exterior metal
102, 102*a*, 102*b*, 102*c*, 102*d* opening
104, 104*a*, 104*b*, 104*c*, 104*d* resin material
106*a*, 106*b*, 106*c*, 106*d* passive element
200, 202, 204, 206 antenna
204*a*, 204*b*, 204*c*, 204*d* patch antenna

The invention claimed is:

1. An antenna apparatus comprising:

a first antenna that operates at a first frequency; and a second antenna that is arranged on an outer side of a casing relative to the first antenna, that operates at a second frequency lower than the first frequency, and that includes an opening in a radiation direction of the first antenna, wherein a passive element is arranged, in the opening, at a position facing the second antenna, the second antenna includes a plurality of patch antennas that are arrayed, the plurality of passive elements are arranged so as to correspond to a plurality of patch antennas, and the plurality of passive elements respectively face the plurality of patch antennas.

2. The antenna apparatus according to claim 1, wherein the second antenna is arranged so as to surround an outer periphery of the casing.

3. The antenna apparatus according to claim 1, wherein the opening is filled with a resin material.

4. The antenna apparatus according to claim 1, wherein a distance between the plurality of patch antennas and the plurality of passive elements is equal to or smaller than 0.5 millimeters (mm).

5. The antenna apparatus according to claim 1, wherein the first frequency is a millimeter-wave frequency compatible with 5G, and the second frequency is a frequency equal to or lower than 4 GHz.

6. The antenna apparatus according to claim 1, wherein the antenna apparatus is mounted on a mobile terminal.

7. The antenna apparatus according to claim 1, wherein the antenna apparatus is mounted on one of an Internet of Things (IoT) terminal and an on-vehicle terminal.

8. The antenna apparatus according to claim 1, wherein the opening is rectangular in shape.

9. The antenna apparatus according to claim 1, wherein a size of the second antenna, d1, is determined as d1=$\lambda/2\sqrt{}/(\varepsilon_r)$, wherein $\lambda$ is a wavelength corresponding to the second frequency and $\varepsilon_r$ is a permittivity of the material of the second antenna.

10. The antenna apparatus according to claim 1, wherein the passive element is metallic.

11. The antenna apparatus according to claim 1, wherein the passive element is rectangular in shape.

12. The antenna apparatus according to claim 1, wherein the casing is metallic.

13. The antenna apparatus according to claim 1, wherein the plurality of patch antennas include at least four groups of patch antennas.

14. The antenna apparatus according to claim 13, wherein the at least four groups of patch antennas are oriented towards different sides of the casing.

15. The antenna apparatus according to claim 13, wherein each of the four groups of patch antennas includes four patch antennas.

16. The antenna apparatus according to claim 1, wherein the plurality of passive elements are rectangular.

17. The antenna apparatus according to claim 1, wherein the plurality of passive elements are smaller than the plurality of patch antennas.

18. The antenna apparatus according to claim 1, wherein the passive element is insulated from the patch antenna by a resin material.

* * * * *